United States Patent [19]

Pearson

[11] 4,235,719
[45] Nov. 25, 1980

[54] PRESSURIZED OXYGENATION SYSTEM AND METHOD

[75] Inventor: Chris C. Pearson, Woodside, Calif.

[73] Assignee: FMC Corporation, San Jose, Calif.

[21] Appl. No.: 890,725

[22] Filed: Mar. 27, 1978

[51] Int. Cl.³ ............................................. C02F 11/02
[52] U.S. Cl. ................................ 210/195.1; 210/220;
  261/36 R; 261/91
[58] Field of Search ...................... 210/7, 8, 13, 14, 15,
  210/60, 63 R, 44, 86, 97, 98, 104, 105, 109, 121,
  137, 188, 195 R, 205, 206, 219, 220, 221 P, 258,
  259; 261/36 R, 87, 93, 91, 124, DIG. 75

[56] References Cited

U.S. PATENT DOCUMENTS

| | | | |
|---|---|---|---|
| 3,355,019 | 11/1967 | Mitchell | 210/104 |
| 3,501,000 | 3/1970 | Roberts | 209/170 |
| 3,530,990 | 9/1970 | Grimshaw | 210/220 |
| 3,617,537 | 11/1971 | Vermette | 210/8 |
| 3,779,913 | 12/1973 | Martin | 210/63 R |
| 3,799,511 | 3/1974 | Svantesson | 210/13 |
| 3,872,003 | 3/1975 | Walker | 210/220 |
| 3,979,293 | 9/1976 | Boulengea | 210/220 |
| 4,043,771 | 8/1977 | Anand | 210/15 |

*Primary Examiner*—Ernest G. Therkorn
*Attorney, Agent, or Firm*—R. S. Kelly; H. M. Stanley

[57] ABSTRACT

A system for performing an oxygenation process within a body of sewage at atmospheric pressure includes an oxygen absorber coupled to an oxygen supply at superatmospheric pressure. A storage vessel has an elongate chamber therein which is oriented vertically in the system. Pipes and valves are coupled to the upper and lower ends of the chamber so that the chamber is alternately communicated with the oxygen absorber and the body of sewage, thereby providing alternate high pressure and low pressure half cycles respectively. Initially, oxygenated liquor at superatmospheric pressure is in the oxygen absorber and the elongate chamber is filled with a quantity of low oxygen content liquor at atmospheric pressure. The valves are then operated during the high pressure half cycle to admit oxygenated liquor into the elongate chamber through the lower end and to simultaneously expel liquor and undissolved oxygen from the upper end into the oxygen absorber. The valves are then operated during the low pressure half cycle to reduce the chamber pressure to atmospheric and to admit a quantity of liquor from the body of sewage into the elongate chamber through the top end while simultaneously expelling the oxygenated liquor from the bottom end into the body of sewage. Thus, oxygen which comes out of solution and collects as relatively large bubbles as the pressure in the chamber is reduced to atmospheric, will be retained in the elongate chamber and returned to the oxygen absorber during the next high pressure half cycle. A preferred embodiment of the invention includes two or more storage vessels alternately operated during the high and low pressure half cycles to provide a substantially continuous flow of liquor into and out of the pressurized oxygen absorber.

7 Claims, 2 Drawing Figures

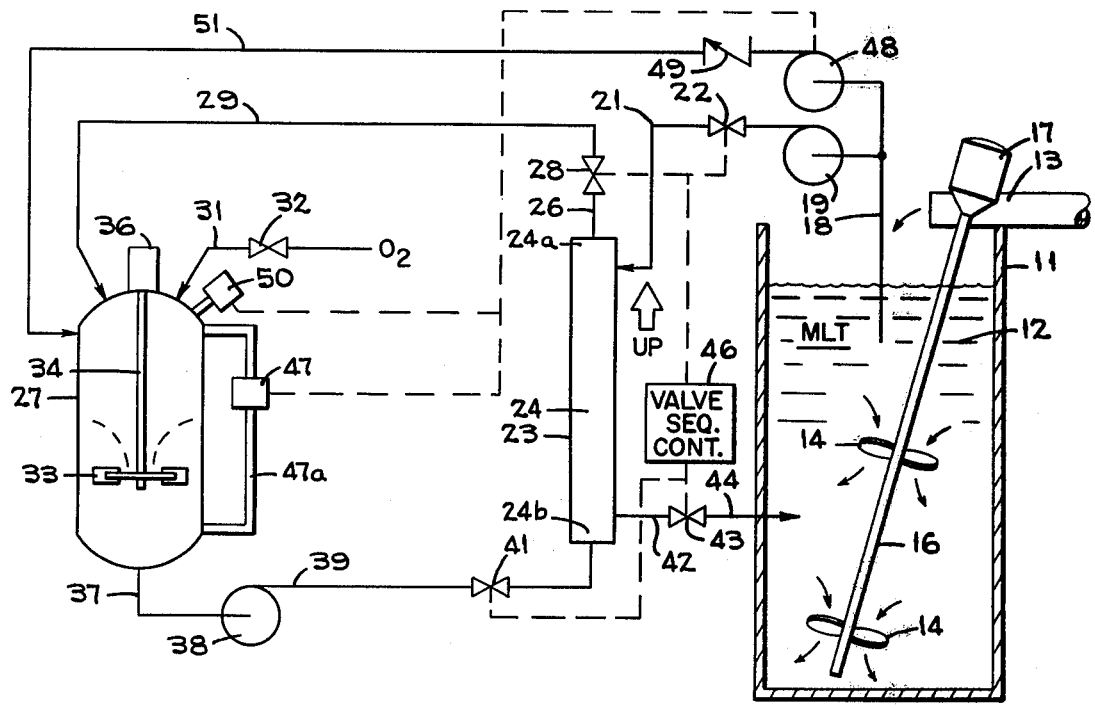
FIG_1
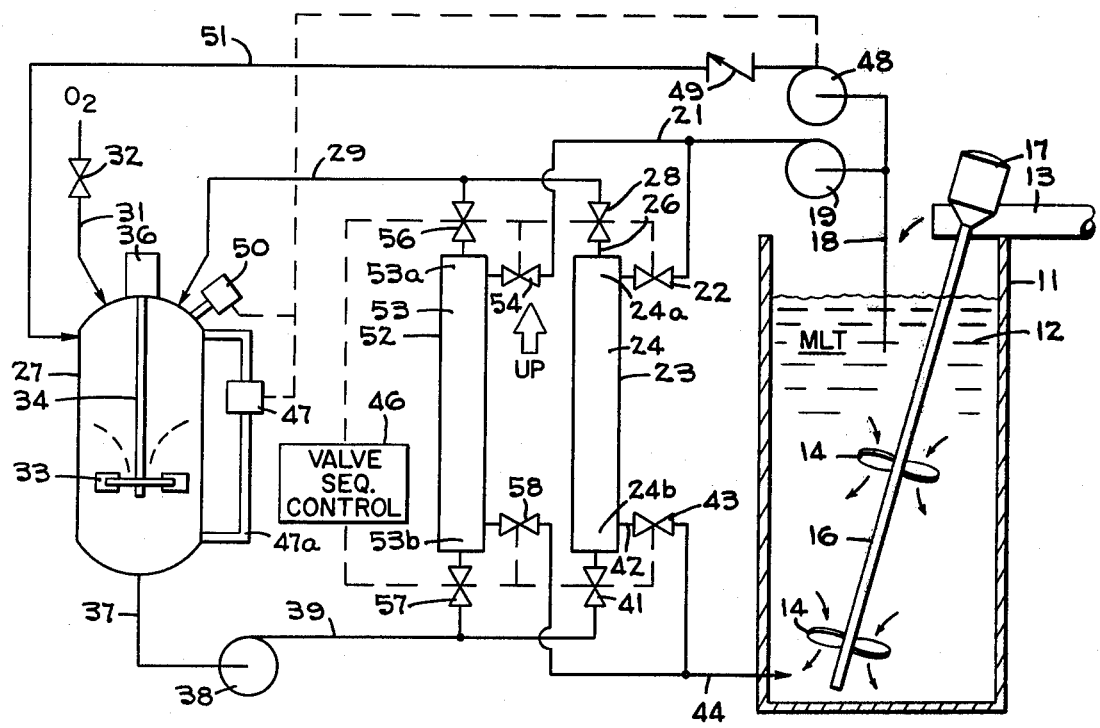
FIG_2

PRESSURIZED OXYGENATION SYSTEM AND METHOD

BACKGROUND OF THE INVENTION

1. Field of the Invention

The present invention pertains to an apparatus and method for increasing the concentration of dissolved oxygen in a body of sewage, and more particularly it pertains to such means and methods which conserve oxygen from the supply from which the oxygen is drawn.

2. Description of the Prior Art

In the treatment of sewage by the conventional activated sludge process, the bacterial colony known as the bio-mass converts the carbon-hydrogen compounds within the sewage to additional bio-mass, carbon dioxide and water. Oxygen is an essential ingredient in this treatment process. During the course of the process enough oxygen must be present within the body of sewage to oxidize essentially all of the biodegradable matter contained therein.

Pressurized oxygenization is a concept for supplying oxygen to the bio-mass in the mixed liquor in an activated sludge sewage treatment system. Contacting (e.g., by bubbling methods) either air or oxygen with the mixed liquor at atmospheric pressure is a costly operation in the treatment of sewage, and the pressurized oxygenization concept offers the possibility of significant savings where oxygen is used. In patent application Ser. No. 822,594, filed Aug. 8, 1977, now U.S. Pat. No. 4,171,263, for "Presurized Oxygenation of Sewage," which is incorporated herein by reference, it is explained that the rate at which oxygen is dissolved in water at any given instant is a function of oxygen-water interfacial contact area and the difference between the concentration of oxygen in the water at saturation and the concentration therein at that instant. In the conventional treatment of sewage with air where oxygen in the air is to be dissolved in the sewage, the interfacial area is increased by agitation of the sewage. The difference at one atmosphere between the concentration of oxygen in the sewage at saturation and at a particular instant is generally 7 or 8 mg. of oxygen per liter of sewage. The agitation of the sewage must be sufficient to dissolve the required oxygen fast enough in the body of sewage to meet the demand of the bio-mass. When the difference between the concentration of oxygen at saturation and the concentration within the body of sewage at the instant is increased, such as by pressurizing the body of sewage, the agitation requirement is lessened, thereby reducing the energy required to oxygenate a given quantity of liquor within a given time.

Oxygen concentration at saturation, as discussed in the foregoing, is proportional to the partial pressure of the oxygen in the contacting gas. The oxygen partial pressure in air at atmospheric pressure is 0.21 atmospheres, and the concentration of oxygen in water at saturation is about 9 mg. per liter at 70° F. When pure oxygen is used to contact a liquid, partial pressure being 1 atmosphere, the concentration at saturation is about 43 mg. per liter, and the rate at which the oxygen enters the liquid is about five times as great as when the partial pressure is 0.21 atmospheres, other factors being equal. Recognizing that the cost for agitating the body of sewage is reduced when using pure oxygen in contact therewith, it must also be recognized that the cost of producing oxygen from the air to obtain pure oxygen usually offsets the agitation cost reduction. The aforementioned patent application Ser. No. 822,594, now U.S. Pat. No. 4,171,263 for "Pressurized Oxygenation of Sewage", in FIG. 4 thereof, shows a sewage treatment system having an oxygen absorber and a pair of cylindrical lock-chambers. A system of check valves provides for alternate filling of the lock-chambers by sewage influent introduced through one end of each of the chambers. A flow separator movable along the length of each lock chamber is thereby forced to the opposite end of the chamber when sewage influent enters the chamber. When the flow separator is at the opposite end of a lock-chamber, a valve is controlled to communicate the oxygen absorber with the opposite end, and the lock-chamber is filled with oxygenated influent from the absorber thereby forcing the flow separator back to the one end of the lock-chamber and simultaneously expelling the sewage influent therein to the oxygen absorber. When the flow separator reaches the one end of the lock-chamber, the valve at the opposite end is then controlled to communicate the opposite end with the body of the sewage. The charge of oxygenated influent within the chamber is then expelled to the body of sewage when the lock-chamber is again filled from the one end with sewage influent. Great care is taken to avoid inducing turbulence in the oxygenated influent when the pressure thereon is released prior to expulsion to the body of sewage as well as during the subsequent transfer from the lock-chamber to the body of sewage. Alternate operation of the two lock-chambers provides a practically continuous flow of supersaturated oxygenated influent from the lock-chambers to the body of sewage. Large bubbles of oxygen which come out of solution from the oxygenated influent within the lock-chambers may be retained therein, providing a compressible fluid within the lock-chambers and therefore requiring additional energy to compress the fluid during the filling of the lock-chambers. Alternatively the large bubbles of oxygen coming out of the oxygenated solution at atmospheric pressure may be transferred with the oxygenated influent to the body of sewage, whereupon they rapidly rise to the surface and are lost before the oxygen has had sufficient contact time with the sewage.

U.S. Pat. No. 3,926,588 for a "Pressurized Transfer System" issued to Speece discloses a system for enhancing the absorption of gas by a fluent material while it is circulated alternately through two closed loops. Flow chambers are disposed in each of the closed loops, within which the fluent material is gasified during each half cycle. During the alternate halves of the cycles, the flow chambers are switched out of the closed loops so that the gasified fluent material therein may be displaced by flow thereto from the source of the fluent material. The flow from the source is under a lower pressure than the pressure which is imposed upon the fluent material during the half cycle when the fluent material is trapped in a closed loop.

The Speece apparatus provides unidirectional flow through each of the flow chambers thereby expelling any gas which comes out of solution each time a flow chamber is purged. Speece envisions such apparatus as useful for the purpose recited in the description of FIGS. 2A and 2B in column 4 of the specification. The Speece specification therein depicts a system wherein air as the gas may be dissolved into a quantity of liquid so that supersaturation and effervescence occurs when the liquid is depressurized and expelled from the flow chambers. The phenomenon is said to be useful in the separation of solids by flotation as well as for oxygenation purposes even though undissolved oxygenated gas is lost from the system.

U.S. Pat. No. 3,530,990, issued to Grimshaw, discloses a system for treating sewage which includes a tank within which are disposed one or more circulator units which receive a segregated quantity of influent directly from the tank. The segregated quantity is subjected to pressure while air is bubbled therethrough to thereby saturate the segregated quantity with air. The segregated quantity is then discharged into the body of sewage to accelerate promotion of bacteria and thereby expedite the treatment of the sewage. The Grimshaw disclosure explicitly envisions discharge of undissolved gas with the oxygenated quantities of influent in the body of sewage.

Several patents deal with dissolving molecular oxygen in a quantity of liquid apart from a main body of liquid and thereafter mixing the oxygenated quantity of liquid with the main body of liquid to enhance the dissolved oxygen content thereof. U.S. Pat. Nos. 3,617,537, issued to Vermette, and 3,799,511, issued to Svantesson, are representative. The Vermette disclosure cites a system for recirculating some sewage influent and dissolving molecular oxygen therein under pressure during recirculation. Turbulence is induced in the recirculating flow to assist in enhancing interfacial contact between the molecular oxygen and the recirculated influent. Oxygen injected into the continuous recirculation flow which is not dissolved therein will be discharged from the main body of sewage into which the oxygenated recirculated flow is injected.

The disclosure in the Svantesson patent discusses the dissolution of molecular oxygen in a liquid by mixing the oxygen with the liquid and subjecting the mixture for an adequate length of time to a pressure such that the oxygen dissolves in the liquid. The dissolved oxygen and liquid mixture is thereafter injected without any significant change in pressure into a body of liquid in which the dissolved oxygen content is to be elevated.

The Svantesson apparatus does not contemplate structure or method steps necessary to inject a supersaturated gasified liquid into a body of liquid with substantially no loss of gas from the solution.

Apparatus and method are desirable for use in oxygenation of bodies of sewage which conserve the molecular oxygen to be dissolved therein.

SUMMARY OF THE INVENTION

A pressurized oxygenation system is disclosed for use in conjunction with an oxygen supply at superatmospheric pressure for the purpose of oxygenating a body of liquor which is at atmospheric pressure and for preserving substantially all of the oxygen that may come out of solution during the oxygenation process. An oxygen absorber is coupled to the oxygen supply and is pressurized thereby. A vessel with a chamber therein is adapted to receive and retain liquids. The chamber has one long dimension disposed with a top end in an elevated position relative to a bottom end. Means is provided for selectively filling the chamber through the top end with liquid at atmospheric pressure and for alternatively communicating the top end of the chamber with the oxygen absorber. Further means is provided for selectively transferring the oxygenated liquid at superatmospheric pressure from the oxygen absorber to fill the chamber from the bottom end thereof. In this fashion oxygenated liquid at superatmospheric pressure displaces liquid within the chamber and the displaced liquid is transferred together with any gas trapped in the chamber from the top of the chamber to the oxygen absorber. Means is also provided for selectively communicating the bottom of the chamber with the body of liquor such means operating to reduce the pressure within the chamber to atmospheric pressure before transfer of the oxygenated liquid therein. The oxygenated liquid within the chamber is displaced by unoxygenated liquid (at atmospheric pressure) introduced into the chamber through the top of the chamber. Thus, while free gaseous oxygen is retained in the chamber, the oxygenated liquid is transferred with minimal turbulence to the body of liquor. A stable body of liquor is obtained in this fashion having a high dissolved oxygen content.

BRIEF DESCRIPTION OF THE DRAWINGS

FIG. 1 is a diagrammatic illustration of one form of apparatus for carrying out the process of the present invention.

FIG. 2 is a diagrammatic illustration of another form of apparatus for carrying out the process of the present invention.

DESCRIPTION OF THE PREFERRED EMBODIMENTS

The invention disclosed herein relates to the treatment of a body of sewage by the well known activated sludge sewage treatment process. The systems disclosed operate to withdraw a small quantity of liquor at atmospheric pressure from the body of sewage and to place the small quantity of liquor into a storage chamber through a storage chamber inlet near the top thereof. Valve manipulation isolates the small quantity of liquor in the chamber from atmospheric pressure and communicates the small body of liquor with a superatmospheric pressure environment. This small quantity of liquor is then transferred to an oxygen absorber, being expelled through a chamber outlet in the uppermost portion of the chamber so that any free oxygen within the chamber is transferred back to the oxygen absorber together with the small quantity of liquor. Oxygenated liquor from the oxygen absorber is introduced into the chamber through a port located near the bottom thereof and acts as the expelling force for the small quantity of liquor expelled toward the oxygen absorber through the top of the chamber. Further manipulation of the valves reduces the pressure on the oxygenated liquor within the chamber without imposing turbulence therein. Transfer of another small quantity of liquor into the chamber entering through the upper port acts to expel the depressurized oxygenated liquor through a lower port which is in communication with the body of sewage. During the transfer a minimum of turbulence is imparted to the depressurized oxygenated liquor. Oxygen coming out of solution in the quantity of oxygenated liquor at atmospheric pressure remains in the upper reaches of the chamber to be returned to the oxygen absorber through the uppermost chamber outlet during the next high pressure half of the cycle. Molecular oxygen coming out of solution during the transfer process from the storage chamber to the body of sewage will be in the form of tiny bubbles entrained in the flow and will be dissolved in the body of sewage while substantially no large bubbles are produced which can escape from the surface of the body of sewage.

Certain of the pumps, valves, and conduits hereinafter described are defined in terms relating to the character of the liquor as it is conducted by these elements during the processing of the liquor. These terms are not intended to impose structural limitations on any of the elements so described. For example, a low pressure half cycle pump included in the apparatus is of a usual pump type, but is required to operate on the liquor being processed during the low pressure half cycle of the oxygenation sequence.

Turning to FIG. 1 of the drawings a mixed liquor tank 11 is shown containing a body of sewage 12 which is replenished through an influent pipe 13. The body of sewage in the mixed liquor tank 11 is continually agitated by some means such as the plurality of paddles 14 mounted on a shaft 16 and driven rotationally by a mixer motor 17.

An outlet pipe 18 having an open end immersed in the body of sewage 12 is connected to a low pressure half-cycle pump 19 which is coupled through a conduit 21 and a low oxygen content inlet valve 22 to a storage vessel, or lock-chamber, 23. Storage vessel 23 has a chamber 24 therein with one long dimension disposed substantially vertically as seen in FIG. 1. It should be noted that the long dimension of chamber 24 need only be elevated so that an upper end 24a is raised relative to a lower end 24b. A high pressure output conduit 26 is in communication with the upper end 24a of chamber 24 and is further in communication with an oxygen absorber 27 through a low oxygen content outlet valve 28 and a conduit 29.

Oxygen absorber 27 is a pressure vessel which is connected to a pressurized oxygen supply through an oxygen inlet conduit 31 having a flow control valve 32 therein. Oxygen absorber 27 is therefore pressurized to the oxygen supply pressure. Absorber 27 may be subjected to lesser pressures by placement of a pressure reduction device (not shown) in the inlet conduit 31. Liquor introduced into oxygen absorber 27 through conduit 29 is violently agitated therein by some means such as a turbine paddle 33 mounted on a shaft 34 and arranged to be continuously driven by a motor 36 mounted on the exterior of the oxygen absorber 27. An adequate pressure seal is provided around shaft 34 where it passes through the case of oxygen absorber 27. An oxygen absorber which is particularly adapted for use in the system of the present invention is disclosed in the copending application of Thomas E. Roberts, Jr., et al, Ser. No. 890,727, entitled "Gas Absorber" and filed on even date herewith, and application being incorporated by reference herein. It is to be understood, however, that other forms of oxygen absorbers 27 are acceptable for use in the system being disclosed.

A high oxygen content outlet pipe 37 is coupled to the oxygen absorber 27 and is further connected to a high pressure half-cycle pump 38. The output from the high pressure half-cycle pump 38 is conducted through a conduit 39 and a high oxygen content inlet valve 41 to the lower end 24b of chamber 24. A low pressure output pipe 42 is connected to the lower end 24b of chamber 24 and is coupled to a high oxygen content outlet valve 43 and a conduit 44 to the body of sewage 12 contained in mixed liquor tank 11.

A valve sequencing control mechanism 46 containing a timer is coupled to the low oxygen content inlet valve 22, the low oxygen content outlet valve 28, the high oxygen content inlet valve 41 and the high oxygen content outlet valve 43. Valves 22 and 43 are synchronized to be opened and closed together by valve sequence control mechanism 46. Valves 28 and 41 are also synchronized to be opened and closed together by valve sequence control 46. Valves 22 and 43 are controlled to an open position during a low pressure half-cycle of an oxygenation sequence, and valves 28 and 41 are controlled to be opened during a high pressure half-cycle of the oxygenation sequence. Valves 22 and 43 are therefore operated between an open and a closed position alternately with valves 28 and 41. All four valves are in a closed position during the transition between high and low pressure half cycles to prevent depressurization of the oxygen absorber 27. It should be understood that low oxygen content inlet valve 22 and low oxygen outlet valve 28 could be combined in a three way valve. In like manner high oxygen content inlet valve 41 and high oxygen content outlet valve 43 could be combined in a single three way valve. The valve sequence control mechanism 46 could, for example, comprise a conventional time-controlled stepping switch which alternatively switches electrical current to the solenoids which operate the valve positioning mechanisms.

A float switch 47 is connected to oxygen absorber 27, functioning to detect the level of liquor therein. Float switch 47 is connected to control the operation of a high pressure pump 48 which is coupled to the outlet pipe 18 of the mixed liquor tank 11. Float switch 47 is of the usual level sensing type wherein a tube 47a is in communication with the fluid contained in oxygen absorber 27 at one end and is in communication with the space above the fluid contained therein at the other end. A pressure switch 50 is provided on oxygen absorber 27, functioning to sense the pressure therein and produce a signal indicating when the oxygen absorber pressure has exceeded a predetermined level. The output from pressure switch 50 is connected to the high pressure pump 48 to shut the pump down in the event the oxygen absorber 27 is being overfilled due to a malfunction in the float switch 47 or lack of response at high pressure pump 48 to the liquor level indication from flow switch 47. High pressure pump 48 is coupled through a check valve 49 and a conduit 51 to the oxygen absorber 27 to keep the requisite level of fluid in the absorber.

The manner in which the apparatus of FIG. 1 operates will now be described. Influent sewage is deposited into the body of sewage in mixed liquor tank 11 continuously replenishing that portion of the body of sewage 12 which flows out of mixed liquor tank 11 (by means not shown) for subsequent well-known sewage processing steps. Low pressure half cycle pump 19 operates continuously against a head of less than 10 feet of water to withdraw fluid from the mixed liquor tank during the low pressure half cycles with said pump bypassing fluid back to the tank during the high pressure half-cycles (by means not shown). Initially, oxygenated liquor is prepared in oxygen absorber 27 and is transferred into chamber 24 while maintaining a high dissolved oxygen content in the liquor. Valve sequence control mechanism 46 opens low oxygen content inlet valve 22 and high oxygen content outlet valve 43 reducing the pressure on the oxygenated liquor contained within chamber 24. Since substantially all of the oxygen content of the oxygenated liquor is in solution and not in bubble form, the reduction of pressure to atmospheric when the valves 22 and 43 are opened creates substantially no turbulence in the oxygenated liquor within chamber 24. However, such liquor will now be in a supersaturated condition since it contains more oxygen at atmospheric pressure than it can maintain in equilibrium solution. Low pressure half-cycle pump 19 operates to pick up liquor from the body of sewage 12 in mixed liquor tank 11 and to transfer it through the low oxygen content inlet valve 22 and conduit 21 into the upper portion of chamber 24. Chamber 24 is dimensioned so that the liquor introduced into the upper end 24a thereof will advance toward the lower end 24b substantially in a "plug flow". It has been found that such a flow condition will be obtained when, for example, fluid velocity is 1.5 feet per second, and chamber 24 is cylindrical in shape having a diameter of 4 inches and an axial length of 88 inches, thereby holding 4.8 gallons of liquor. Simultaneously with the entry of low oxygen content liquor through the upper end 24a of chamber 24, the supersaturated oxygenated liquor contained therein is expelled from the lower end 24b through the low pressure outlet pipe 42, high oxygen content valve 43 and conduit 44 into the body of sewage 12 within mixed liquor tank 11. The transfer of the oxygenated liquor at atmospheric pressure from the lower end 24b of chamber 24 is accomplished without imposing appreciable turbulence therein by controlling fluid velocity, by keeping the path relatively free of sharp bends and other turbulence inducing structures, and by limiting the length of the path. Thus, the unstable supersaturated fluid is transferred quickly to the mixed liquor tank where it is diluted with the much larger subsaturated body of sewage 12 to maintain substantially all of the oxygen in solution. It has been found advantageous to use an oversized valve for high oxygen content outlet valve 43 such as a 3- or 4-inch full opening ball valve. It has been found that an appropriate length of the path for the oxygenated liquor from the lower end 24b of chamber 24 to the mixed liquor tank 11 may be typically 10 inches and the transfer may take approximately 36 seconds without losing noticeable amounts of oxygen from the solution in the process. Once the solution, which is supersaturated with dissolved oxygen at atmospheric pressure, is introduced into the mixed liquor tank 11, the mixing action performed by the plurality of paddles 14 quickly disperses it throughout the body of sewage 12. Substantially no oxygen escapes from the surface of the body of sewage 12 in the form of bubbles as the supersaturated oxygen-liquor solution is diluted by the body of sewage 12 to form a stable subsaturated solution of sewage and oxygen containing a sufficient concentration of dissolved oxygen to serve the needs of the bio-mass.

Oxygen which comes out of the solution and coalesces as bubbles in the supersaturated liquor at atmospheric pressure which has just been expelled from the lower end 24b of chamber 24 rises to the top end 24a of chamber 24 rather than being expelled through conduit 44 into the body of sewage 12 in mixed liquor tank 11. After the lapse of sufficient time to completely fill chamber 24 with low oxygen content liquor through plug flow from the upper end 24a, valves 22 and 43 are closed by valve sequence control mechanism 46, and low oxygen content outlet valve 28 and high oxygen content inlet valve 41 are thereafter opened. Consequently, chamber 24 is subjected to the superatmospheric pressure level existent in oxygen absorber 27. High pressure half-cycle pump 38, which operates continuously and recycles fluid (by means not shown) when valve 41 is closed, withdraws oxygenated liquor from oxygen absorber 27 and transfers it through conduit 39 and the open high oxygen content inlet valve 41 into the lower end 24b of chamber 24. As previously pointed out, high pressure half-cycle pump 38 is termed such merely because it operates in a high pressure environment. Pump 38 is not required to pump against a high pressure head but only to overcome the frictional losses in the closed loop path. Again, due to the dimensions of chamber 24 recited hereinbefore, the oxygenated liquor entering chamber 24 from the lower end 24b moves in plug flow upwardly through chamber 24 simultaneously expelling the low oxygen content liquor from the chamber through opened low oxygen content outlet valve 28 and conduit 29 and into oxygen absorber 27 together with any oxygen in gaseous phase which has previously escaped from solution in the chamber. Oxygen which has disengaged from solution is thereby recovered and returned to oxygen absorber 27 to be absorbed by the liquor contained therein. Since there is some volume taken up by the undissolved oxygen transferred with the low oxygen content liquor through conduit 29 to oxygen absorber 27, the level of liquor present therein in which oxygen is to be dissolved may gradually lower. This lowering is sensed by float switch 47 which actuates the high pressure pump 48. Liquor is thereby pumped through the outlet pipe 18, through the check valve 49 and the conduit 51 into the oxygen absorber 27 to restore the desired level of liquor therein. In the event float switch 47 does not operate to indicate when the predetermined level of liquor within oxygen absorber has been reached, high pressure pump 48 will continue to deposit liquor therein through conduit 51. When the level of liquor within oxygen absorber 27 reaches a point such that the pressure therein rises sufficiently above the desired superatmospheric pressure, pressure switch 50 will produce a signal coupled to high pressure pump 48 which functions to shut the pump down and arrest the flow of liquor through the conduit 51.

After sufficient time has elapsed during the high pressure half-cycle for chamber 24 to be filled by oxygenated liquor, valve sequence control mechanism 46 will again close the valves 28 and 41 and open valves 22 and 43, thereby reducing the pressure on the oxygenated liquor within chamber 24 and reinitiating the low pressure half-cycle to fill chamber 24 from the top 24a thereof with low oxygen content liquor and to simultaneously expel supersaturated liquor from the low end 24b thereof into the body of sewage 12 in mixed liquor tank 11. It should be noted that while low pressure half-cycle pump 19 is operated continuously, it pumps out only during the low pressure half-cycle of the oxygenation period. Pump 19 is preferably a centrifugal type pump and uses minimal power when the flow path is blocked downstream thereof by closing valve 22 during the high pressure half-cycle. Conversely, the high pressure half-cycle pump 38 operates continuously but pumps out only during the high pressure half-cycle while using minimal power during the low pressure half-cycle.

By way of example, the apparatus of FIG. 1 operating in a 1 million gallon per-day plant that treats waste having 200 mg. per liter biochemical oxygen demand (BOD) may contain an oxygen absorber having a 222 gallon capacity and a lock-chamber 23 having a 70 gallon capacity within its chamber 24. The capacity of the mixed liquor tank 11 is considerably larger, typically being in the region of 3 million gallons. Low pressure half-cycle pump 19 and high pressure half-cycle pump 38 may be typically 2 horse power pumps capable of producing flow rates of 400 gallons per minute when operating against a head of 10 feet of water. Molecular oxygen flow rate into the 222 gallon capacity oxygen absorber 27 when filled with 200 gallons of liquid is typically 70 pounds per hour. Pressure maintained within oxygen absorber 27 in this example is 200 psig. Pressure within oxygen absorber 27 may be supplemented by an additional pump (not shown). With the foregoing figures being characteristic of the system components it is found that 67 gallons of oxygenated liquor containing 350 mg. per liter of oxygen may be injected every 10 seconds into a 3 million gallon capacity mixed liquor tank 11 to thereby maintain the oxygen content in a capacity load of sewage at not less than 1.5 mg. per liter.

FIG. 2 shows a modified, and preferred, form of the apparatus for use in carrying out the process of the invention disclosed herein. Like items to those described in the embodiment of FIG. 1 are assigned like item numbers in FIG. 2. An additional storage vessel, or lock-chamber, 52 is shown in FIG. 2 enclosing an additional chamber 53 having a configuration similar to that of chamber 24. Both chambers 24 and 53 are dimensioned so that liquid introduced at one end thereof will advance in a plug flow pattern toward the opposite end with minimal mixing with the liquid already within the chamber. Thus, the last mentioned liquid is expelled from the opposite end of the chamber. Like chamber 24, chamber 53 has a long dimension which is vertically disposed so that an upper end 53a is raised in elevation relative to a lower end 53b. As mentioned hereinbefore in the description of chamber 24, it is not necessary that the long dimension of chamber 53 be absolutely vertical, but only that upper end 53a be elevated sufficiently over lower end 53b so that free gas within chamber 53 in bubble form will readily rise to upper end 53a.

Associated with storage vessel 52 is a second low oxygen content inlet valve 54 which communicates the upper end 53a of chamber 53 with low pressure half-cycle pump 19 through conduit 21. A second low oxygen content outlet valve 56 is also coupled to the upper end 53a of chamber 53 for the purpose of communicating the upper end of the chamber 53a with the oxygen absorber liquid inlet conduit 29. A second high oxygen content inlet valve 57 is coupled to the lower end of the chamber 53b, thereby communicating chamber 53 with the high pressure half-cycle pump 38 through conduit 39. The lower end of the chamber 53b is also coupled to a second high oxygen content outlet valve 58 which selectively communicates the lower end of the chamber 53b with the body of sewage 12 through conduit 44. Valves 56 and 57 are actuated to an open condition by valve sequence control mechanism 46 during the high pressure half of the oxygenation cycle for chamber 53, while valves 54 and 58 are in a closed condition. During the low pressure half of the oxygenation cycle for chamber 53, sequence control mechanism 46 operates to open valves 54 and 58 while closing valves 56 and 57. Valve sequence control mechanism 46 operates to subject chamber 24 to a high pressure half-cycle while chamber 53 is being subjected to a low pressure half-cycle, and to subsequently subject chamber 53 to a high pressure half-cycle while simultaneously subjecting chamber 24 to a low pressure half-cycle. Thus, chambers 24 and 53 are alternately subjected to high and low pressure half-cycles by appropriate control of the valves coupled thereto.

By way of explanation of the function of the apparatus of FIG. 2, it should be noted that low pressure half-cycle pump 19 and high pressure half-cycle pump 38 are continuously operating to pump fluid through the system in this embodiment. It is assumed initially that oxygen absorber 27 contains a sufficient level of liquor therein which is agitated by structure typified by turbine paddle 33 to form a vortex in the liquor and to thereby mix molecular oxygen under superatmospheric pressure with the liquor to form an oxygenated liquor solution. Moreover, it will be assumed that initially the second low oxygen content outlet valve 56 and the second high oxygen content inlet valve 57 are controlled to the open position by the valve sequence control mechanism 46 and that valves 54 and 58 are consequently in the closed position. At the same time the low oxygen content inlet valve 22 coupled to the upper end 24a of the chamber 24 and the high oxygen content outlet valve 43 coupled to the lower end 24b of the chamber 24 are controlled to an open position by valve sequence control mechanism 46. Valves 28 and 41 are then closed thereby. All 4 valves associated with each of the lock-chambers 53 and 24 are closed during the transition between the low and high pressure half-cycles as previously explained. Valve sequence control mechanism 46 thus imposes a brief time delay prior to opening the appropriate pairs of valves so that pressure will not be bled off from the oxygen absorber 27. With the foregoing valve positioning, chamber 53 is filled with a charge of oxygenated liquor, and chamber 24 is filled with a charge of low oxygen content liquor newly drawn from the body of sewage 12. Chamber 53 is therefore in the high pressure half-cycle, and chamber 24 is in the low pressure half-cycle of their respective oxygenation sequences. It will be seen that the oxygenated liquor under superatmospheric pressure in chamber 53 will retain substantially all of the oxygen in solution since the solution is subsaturated at the pressure within the chamber 53. At the same time it will be seen that there may be some oxygen in gaseous form in the upper portion 24a of chamber 24 which came out of solution with the oxygenated liquor at atmospheric pressure which was expelled from chamber 24 by the low oxygen content liquor presently therein. Since chambers 24 and 53 are alternately subjected to high and low pressure half-cycles, when valve sequence control mechanism 46 subsequently closes valves 56 and 57 and opens valves 54 and 58, the control also operates to open valves 28 and 41 and close valves 22 and 43. The foregoing valve selection reduces the pressure on the oxygenated liquor in chamber 53 to atmospheric pressure while imparting minimal turbulence thereto. The low oxygen content liquor contained in chamber 24 is isolated from atmospheric pressure by the closure of valves 22 and 43 and is subjected to the superatmospheric pressure within oxygen absorber 27 by the opening of the valves 28 and 41. High pressure half-cycle pump 38 delivers oxygenated liquor from oxygen absorber 27 to the open high oxygen content inlet valve 41 through the lower portion 24b of chamber 24. The oxygenated liquor flows upwardly within chamber 24 in plug flow, forcing the low oxygen content liquor together with any undissolved gas out of the upper end 24a of chamber 24, through the low oxygen content outlet valve 28 and conduit 29 and into the oxygen absorber 27. Any oxygen within chamber 24 is thereby recovered and returned to the oxygen absorber 27 for use, and the chamber 24 is filled with a charge of oxygenated liquor at superatmospheric pressure. Simultaneously with the filling of chamber 24 with oxygenated liquor, a quantity of low oxygen content liquor from the body of sewage 12 is picked up through outlet pipe 18 and urged by low pressure half-cycle pump 19 to flow through conduit 21 and the second low oxygen content inlet valve 54 into the upper end 53a of chamber 53. The low oxygen content liquor introduced into chamber 53 moves in plug flow downwardly therein forcing the supersaturated oxygenated liquor therein out through the second high oxygen content outlet valve 58 and conduit 44 into the body of sewage 12. Oxygen which escapes from the supersaturated oxygenated liquor being expelled from chamber 53 will float to the upper end 53a of the chamber to remain there and be expelled to the absorber 27 through second low oxygen content outlet valve 56 during the next high pressure half-cycle for chamber 53. The path for the oxygenated liquor from chamber 53 to the body of sewage 12 within mixed liquor tank 11 is free of sharp bends and other structure which will cause turbulence that could strip the oxygen from the metastable supersaturated solution. The path from the lower end 53b of chamber 53 to valve 58 and conduit 44 for the supersaturated oxygenated liquor is also of a length such that the charge from chamber 53 may be transferred to the body of sewage 12 within a sufficiently short period of time so that substantially no oxygen escapes from solution during transit. Subsequently, valves 54 and 58 are closed and valves 56 and 57 are opened when valves 28 and 41 are closed and valves 22 and 43 are opened. Chamber 24 is now in the low pressure half-cycle of the oxygenation period, and chamber 53 has now returned to the high pressure half-cycle. Oxygenated liquor is again urged by the high pressure half-cycle pump 38 to enter through second high oxygen content inlet valve 57 into the bottom 53b of chamber 53, moving in plug flow upwardly therein and thereby forcing the low oxygen content liquor together with oxygen in gaseous form collected in the upper portion 53a of chamber 53 out through the second low oxygen content outlet valve 56 and the conduit 29 and into the oxygen absorber 27. The oxygenated liquor in chamber 24 having been brought to atmospheric pressure is now supersaturated and is expelled through high oxygen content valve 43 by the plug flow of the low oxygen content liquor which is introduced through low oxygen content inlet valve 22 into the upper end 24a of chamber 24.

In the foregoing fashion chambers 24 and 53 are alternated between low pressure and high pressure half-cycles so that a continuous sequence of oxygen supersaturated quantities of liquor are injected alternately from chambers 24 and 53 into the body of sewage 12. As described hereinbefore, the rotation of the mixing paddles 14 disperses the supersaturated liquor throughout the body of sewage 12 within mixed liquor tank 11 so that substantially all of the oxygen in solution is retained in solution and the dissolved oxygen content of the body of sewage 12 is increased throughout. The oxygen content of the entire body of sewage 12 is therefore maintained at a level which substantially enhances the oxidation processes occurring within the mixed liquor tank 11. Moreover, molecular oxygen is conserved as it is returned to the oxygen absorber 27 from the upper portions 23a and 53a of chambers 24 and 53, respectively, with each new charge of low oxygen content liquor delivered thereto.

By way of example, the apparatus of FIG. 2 utilizing the same oxygen supply, oxygen absorber 27, and high and low pressure half-cycle pumps 38 and 19 respectively disclosed in the embodiment of FIG. 1, together with a pair of similar storage vessels 23 and 52, each having 35 gallon capacities, will provide supersaturated liquor containing 350 mg. per liter of oxygen at 400 gallons per minute to the mixed liquor tank 11, to thereby maintain the dissolved oxygen content in 3 million gallons of sewage 12 at no less than 1.5 mg. per liter. However, the efficiency in this example over that given in association with the embodiment of FIG. 1 is improved, because the high and low pressure half-cycle pumps 38 and 19 do not have to idle for a half period as in the FIG. 1 embodiment.

It should be noted that the liquid urged into the oxygenation system by high pressure pump 48 and low pressure half-cycle pump 19 may be obtained from a different source than that provided by the body of sewage 12 in the mixed liquor tank 11. For example, fresh sewage may be brought directly through the oxygenating system rather than being recycled through the mixed liquor tank.

Although the best modes contemplated for carrying out the present invention have been herein shown and described, it will be apparent that modification and variation may be made without departing from what is regarded to be the subject matter of the invention.

What is claimed is:

1. A system for dissolving oxygen from a pressurized oxygen supply into a body of liquid to be oxygenated, comprising an absorber in communication with the oxygen supply operating to oxygenate liquid therein at superatmospheric pressure, a storage vessel lock-chamber oriented substantially vertically to define an elevated top end and a bottom end disposed therebelow and configured to be filled by a predetermined volume of liquid first means for selectively transferring liquid to enter the top end of said lock-chamber at atmospheric pressure, second means for selectively communicating the bottom end of said lock-chamber with the body of liquid, so that when liquid is transferred into said top end thereof, a like amount of liquid is displaced from said lock-chamber and gently transferred at atmospheric pressure from said bottom end to the body of liquid, third means for selectively communicating said top end of said lock-chamber with said absorber and for transferring the contents of said lock chamber including free oxygen gas rising therefrom to said absorber, and, fourth means for selectively transferring oxygenated liquid from said absorber to said bottom end of said lockchamber, said oxygen absorber and said storage vessel lock-chamber together with said third means and said fourth means together defining a closed system for transferring liquid to be oxygenated and gaseous oxygen from said lock-chamber to said absorber and thence back to said lock-chamber without gaseous oxygen loss therefrom when said first and second means are selectively noncommunicating, so that when oxygenated liquid is transferred to the bottom end of said lock-chamber at said superatmospheric pressure, the predetermined volume of liquid therein is displaced together with trapped gas and transferred to said absorber through said third means for selectively communicating said top end of said lock-chamber with said absorber, whereby oxygen escaping from solution in said lock chamber is returned to said absorber and a supersaturated predetermined volume of liquid is thereafter mixed with the body of liquid to thereby raise the dissolved oxygen content therein.

2. A system as in claim 1 wherein said second and third means for selectively communicating the bottom end and the top end of said lock-chamber to the body of liquid and said absorber respectively include a high oxygen content outlet valve and a low oxygen content outlet valve respectively, and said first and fourth means for selectively transferring to the top end and bottom end respectively of said lock chamber include a low oxygen content inlet valve and a high oxygen content inlet valve respectively, and further means for operating said high oxygen content outlet valve and said low oxygen content inlet valve together between open and closed positions with both of said valves being operated alternately with said low oxygen content outlet valve and said high oxygen content inlet valve.

3. A system as in claim 1 including two storage lock-chambers, said fourth means for transferring said oxygenated liquid from said absorber including a high pressure cycle valve for each of said two storage lock-chambers, said first means for transferring a portion of the liquid into said top end of said lock-chamber including a low pressure cycle valve for each of said two storage lock-chambers said low pressure cycle valves operating to pass liquid alternately to each of said two storage lockchambers and said high pressure cycle valves operating to pass oxygenated liquid alternately to each of said two storage lock-chambers, whereby a portion of liquid is continuously being directed to one of said two storage lock-chambers and oxygenated liquid is continuously being transferred to said body of liquid.

4. A system as in claim 3 together with means for controlling the sequence of operation of said high and low pressure cycle valves so that flow through said two storage lock-chambers is opposite and alternate in direction.

5. A pressurized oxygenation system for a body of liquid for use with a source of oxygen at superatmospheric pressure, comprising first and second storage vessels each having a lock-chamber therein oriented substantially vertically to define one top end thereof elevated relative to the other lower bottom end thereof, an oxygen absorber coupled to said oxygen source, first means for communicating said one top end of each of said chambers with said oxygen absorber, second means for transferring oxygenated liquid from said oxygen absorber into each of said lock-chambers through said bottom end thereof, means for controlling said first means for communicating one top end of each of said lock-chambers and said second means for transferring oxygenated liquid so that oxygenated liquid is simultaneously admitted through said bottom end of said lock-chamber and liquid together with undissolved gas is expelled through said top end of said lock-chamber alternately from said first and second storage vessels, said oxygen absorber and said lock-chambers together with said first means, said second means, and said controlling means together defining a closed system for transferring liquid to be oxygenated and gaseous oxygen from said lock-chambers to said absorber and thence back to said lock-chambers without gaseous oxygen loss therefrom, third means for transferring liquid into each of said lock-chambers through said elevated top end thereof, and, fourth means for communicating said bottom end of each of said lock-chambers with the body of liquid, said means for controlling further operating to control said third means for transferring liquid and said fourth means for communicating said other end of each of said lock-chambers so that liquid is simultaneously admitted through said top end of said lock-chamber and oxygenated liquid is expelled at atmospheric pressure with minimal turbulence through said bottom end of said lock-chamber alternately from said second and first storage vessels, whereby expelled oxygenated liquid when mixed with the body of liquid provides a high dissolved oxygen content therein.

6. A pressurized oxygenation system as in claim 5 wherein said third means for transferring liquid into each of said lock-chambers comprises a low pressure cycle pump and first and second liquid input valves coupled to said lock-chambers in said first and second storage vessels respectively, and wherein said second means for transferring oxygenated liquid into each of said lock-chambers comprises a high pressure cycle pump and first and second oxygenated liquid input valves coupled to said lock-chambers in said first and second storage vessels respectively, said means for controlling operating to alternately open said first and second liquid input valves and to alternately open said second and first oxygenated liquid input valves synchronously with said first and second liquid input valves, respectively, whereby pressure in said lock-chambers is superatmospheric when said first and second oxygenated liquid input valves are open and atmospheric when said first and second liquid input valves are open.

7. The oxygenation system of claim 1 or claim 5 wherein said body of liquid is sewage containing biodegradable matter.

* * * * *